R. KRAUSE.
WRINGER.
No. 175,567. Patented April 4, 1876.
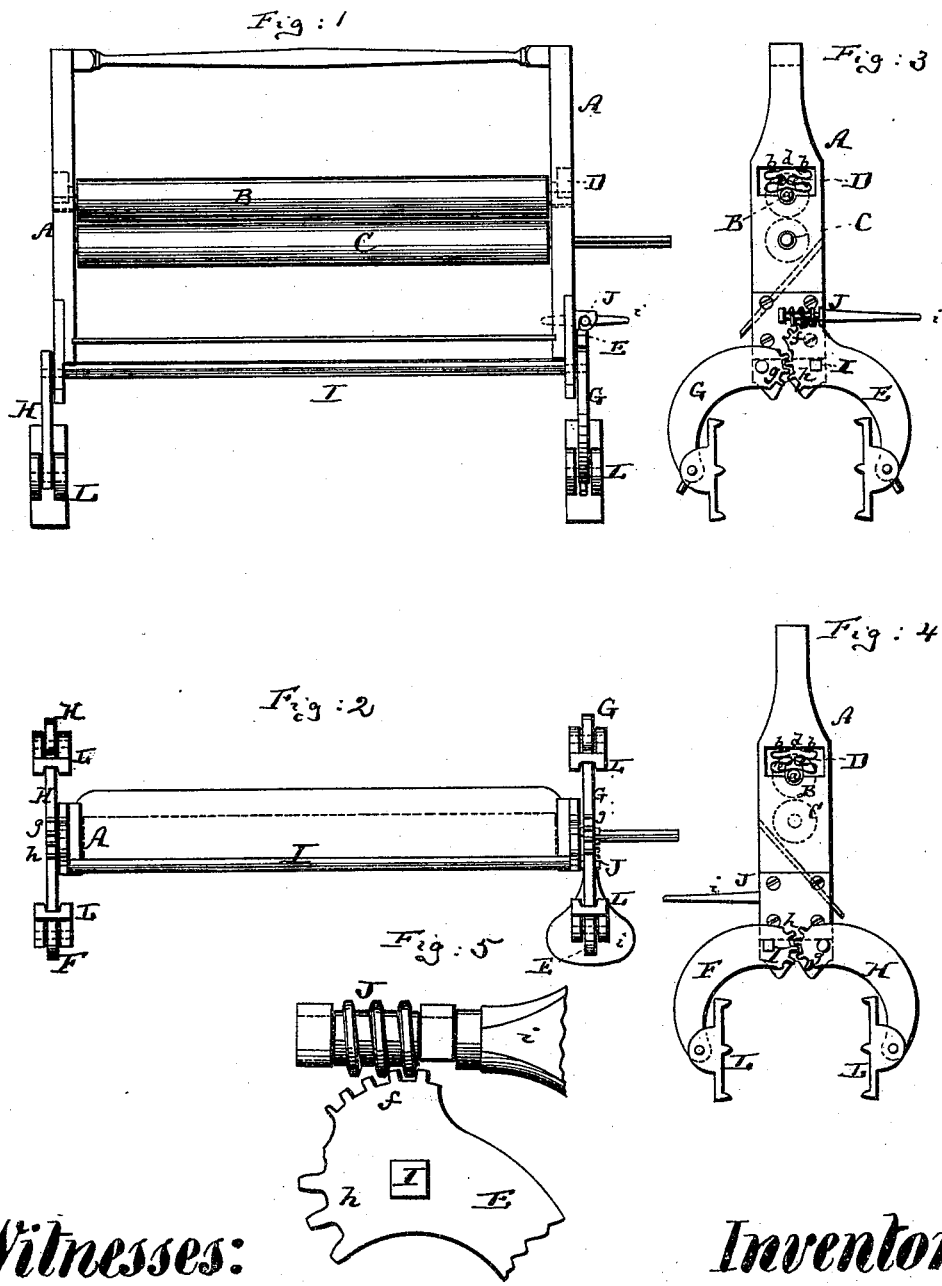

UNITED STATES PATENT OFFICE.

ROBERT KRAUSE, OF NEW YORK, N. Y.

IMPROVEMENT IN WRINGERS.

Specification forming part of Letters Patent No. 175,567, dated April 4, 1876; application filed September 13, 1875.

*To all whom it may concern:*

Be it known that I, ROBERT KRAUSE, of New York city, in the county and State of New York, have invented a new and Improved Wringer, of which the following is a specification:

Figure 1 is a side view of my improved wringer. Fig. 2 is a bottom view of the same. Figs. 3 and 4 are end views of the same, showing its opposite ends. Fig. 5 is a detail face-view of the worm and segment on one jaw.

Similar letters of reference indicate corresponding parts in all the figures.

This invention relates to improvements in the clamping attachments to wringers; and consists, first, in combining a worm with a toothed segment formed on one of the clamping-jaws of the wringer, said jaw being mounted upon a bar or shaft upon which the other parallel jaw is also firmly secured. The invention also consists in combining, with the clamping-jaws above described, and with the worm that operates them, a second pair of clamping-jaws, which have also toothed segments formed on them, to mesh into similar teeth on the first pair of jaws. When all these four movable jaws are used on one wringer, or other instrument, they are all simultaneously moved by the action of the worm that gears into one of the jaws; and when the first pair of jaws only is used in connection with stationary jaws, they (the first pair) will be jointly moved by the action of the worm.

In the accompanying drawing, the letter A represents the frame of the wringer. B and C are the rollers thereof. E and F are the front jaws, by which the wringer is to be clamped to a suds-box, or other support. G and H are the rear jaws. The front jaws E F are mounted upon, and rigidly fastened to, a shaft or bar, I, which is hung in the lower part of the frame A, parallel with the rollers B C, as shown, which shaft is at liberty to turn in its bearings, but whenever it turns the jaws E F must turn with it. The jaw E has formed on it a toothed segment, *f*, into which a worm, J, that is hung to the end of the wringer-frame, meshes in such a manner that, by turning said worm—which is provided with a suitable handle, *i*, so it may be easily grasped and turned—the jaw E will be turned with its supporting-shaft I in the required direction, and the jaw F will follow the motion, so as always to be parallel with E. Now, whether or not the jaws G H are movable or stationary, it is evident that by the arrangement of the worm J and toothed segment *f*, I am able, with a few turns of the worm, to clamp and unfasten the wringer to and from the required support, and to hold it clamped. When the jaws G and H are made movable they are pivoted to the frame A, and are, in accordance with my invention, provided at their upper parts with toothed segments *g g*, that mesh into corresponding toothed segments *h h* formed on the jaws E and F respectively. By this connection of these toothed segments *g g* and *h h* the four jaws are simultaneously moved toward or away from each other, as may be desired, all under the action of the worm J. The lower ends of the several jaws may be finished in suitable way. They are represented as provided with claws L L pivoted to them respectively; but to these I do not confine myself. As to the arrangement of jaws above described it is evident that the same may be advantageously employed on other machines than wringers.

I claim as my invention—

1. The combination of the worm J with the clamping-jaw E, toothed segment *f*, and with the shaft I and jaw F, all arranged so that by the motion of the worm the two jaws and their connecting-shaft will be moved simultaneously, substantially as described.

2. The jaws G H, provided with the toothed segments *g g*, and combined with the jaws E F that have the toothed segments *h h*, substantially as herein shown and described.

ROBERT KRAUSE.

Witnesses:
 ERNEST C. WEBB,
 F. V. BRIESEN.